Oct. 15, 1940.  C. E. MEYERHOEFER  2,218,408
COMBINED HORN AND LAMP FOR VEHICLES
Filed Dec. 17, 1936  3 Sheets-Sheet 1

INVENTOR.
CARL E. MEYERHOEFER
BY
ATTORNEYS.

Oct. 15, 1940.   C. E. MEYERHOEFER   2,218,408
COMBINED HORN AND LAMP FOR VEHICLES
Filed Dec. 17, 1936   3 Sheets-Sheet 2
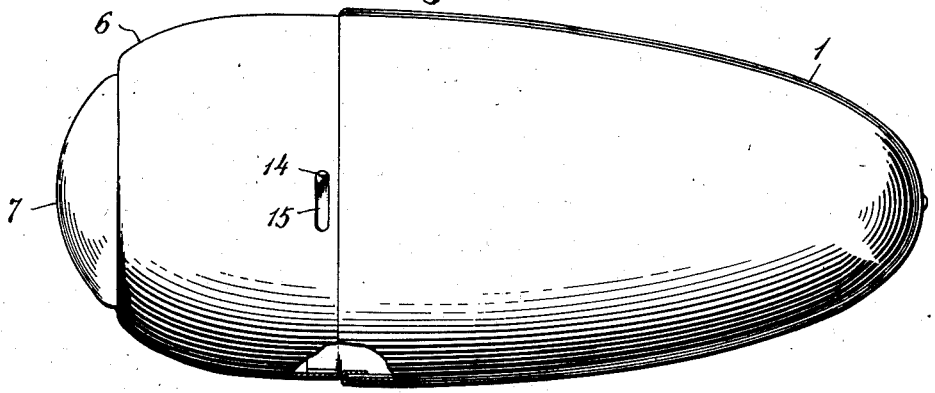
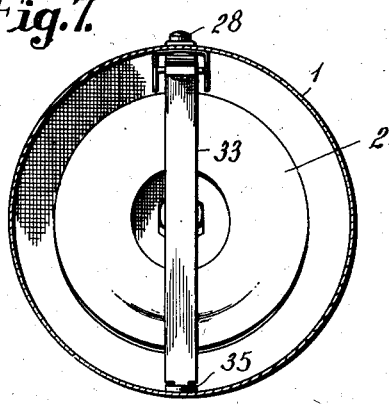
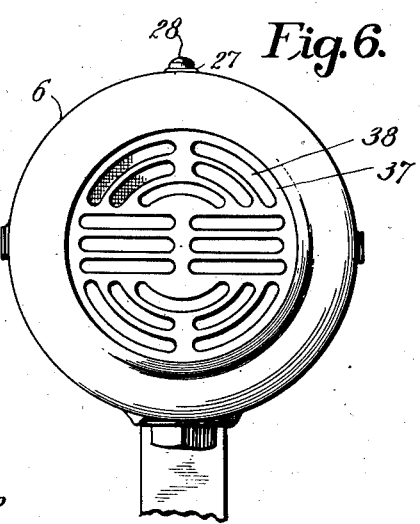
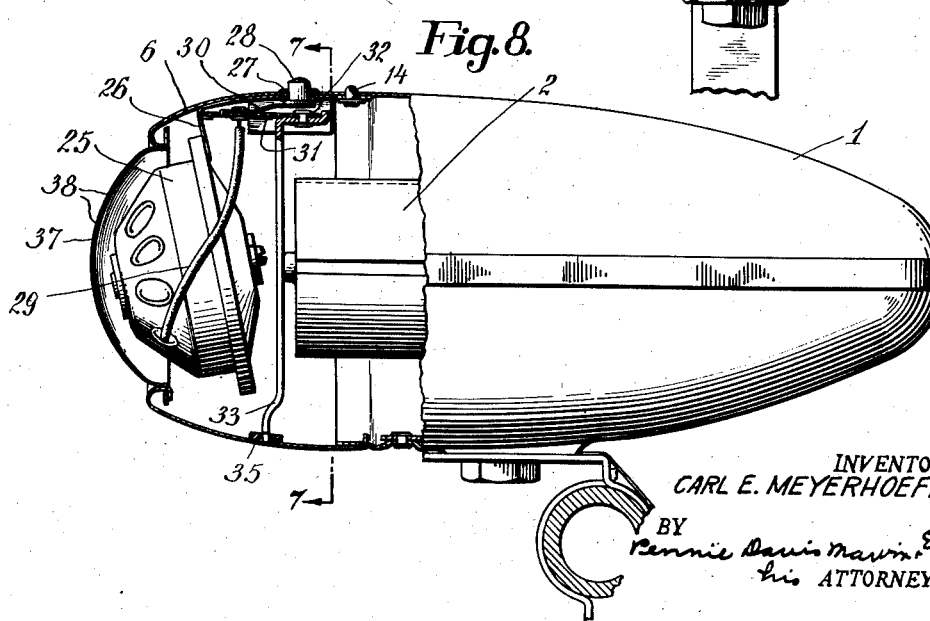
INVENTOR.
CARL E. MEYERHOEFER
BY
his ATTORNEYS.

Oct. 15, 1940.   C. E. MEYERHOEFER   2,218,408
COMBINED HORN AND LAMP FOR VEHICLES
Filed Dec. 17, 1936   3 Sheets-Sheet 3
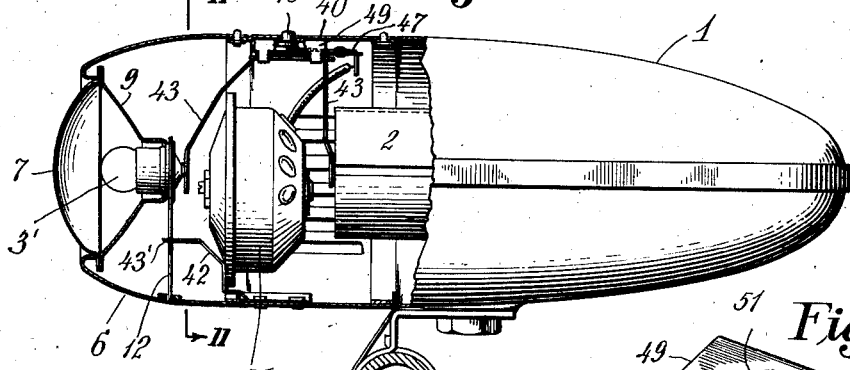
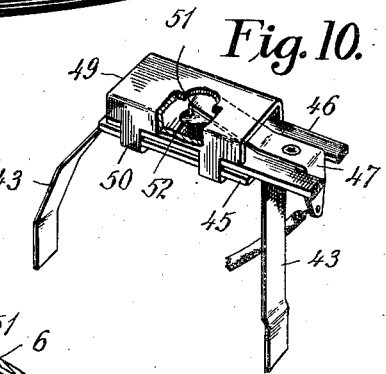
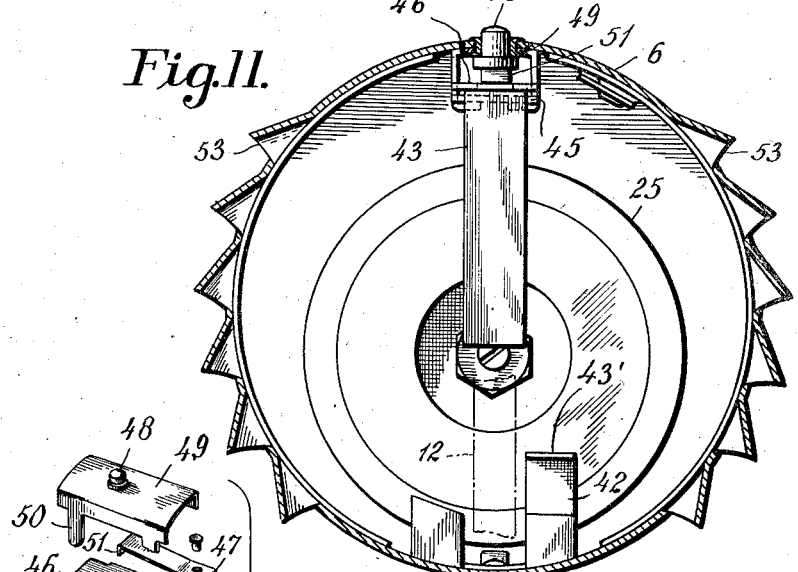
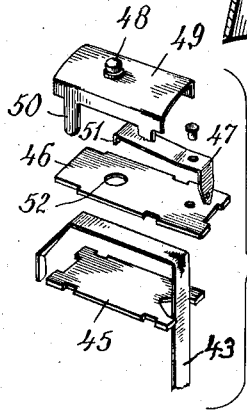
INVENTOR.
CARL E. MEYERHOEFER
BY
ATTORNEYS.

Patented Oct. 15, 1940

2,218,408

UNITED STATES PATENT OFFICE 2,218,408

COMBINED HORN AND LAMP FOR VEHICLES

Carl E. Meyerhoefer, Brooklyn, N. Y., assignor to E. A. Laboratories, Inc., Brooklyn, N. Y., a corporation of New York Application December 17, 1936, Serial No. 116,250

7 Claims. (Cl. 177—7)

This invention relates to improvements in bicycle and automobile accessories, and has for its object to provide a battery-operated horn or light, or combined horn and light, of a size readily adaptable for attachment to a bicycle.

A further object of the invention is to provide a device of this character of simple construction, consisting largely of simple stampings and screw machine parts, but which is nevertheless a thoroughly serviceable accessory, either as a light, a warning signal or both, as the case may be.

A further object of the invention is to provide an accessory of the class described which is neat in appearance, with the modern stream-line effect, and in which the parts are interchangeable to a large extent; that is to say, many of the parts are the same in the horn and the light and the combined horn and light, whereby the advantages of quantity production are obtained for all three types.

In the accompanying drawings I have illustrated a preferred embodiment of my invention as it is now being manufactured for commercial production, and in said drawings:

Fig. 5 is a plan view of the lamp shown in Fig. 2;

Fig. 6 is an end view of the accessory when constructed as a horn;

Fig. 7 is a sectional view of the horn on line 7—7 of Fig. 8;

Fig. 8 is a side elevation partly in section of the horn;

Fig. 9 is a similar view of the combined horn and lamp;

Fig. 10 is a perspective view of the switch mechanism employed in the combined horn and lamp;

Fig. 11 is a sectional view on line 11—11 of Fig. 9; and

Fig. 12 is a perspective view of the parts of the switch separated from each other but arranged in the relative positions in which they are assembled.

Figure 2:
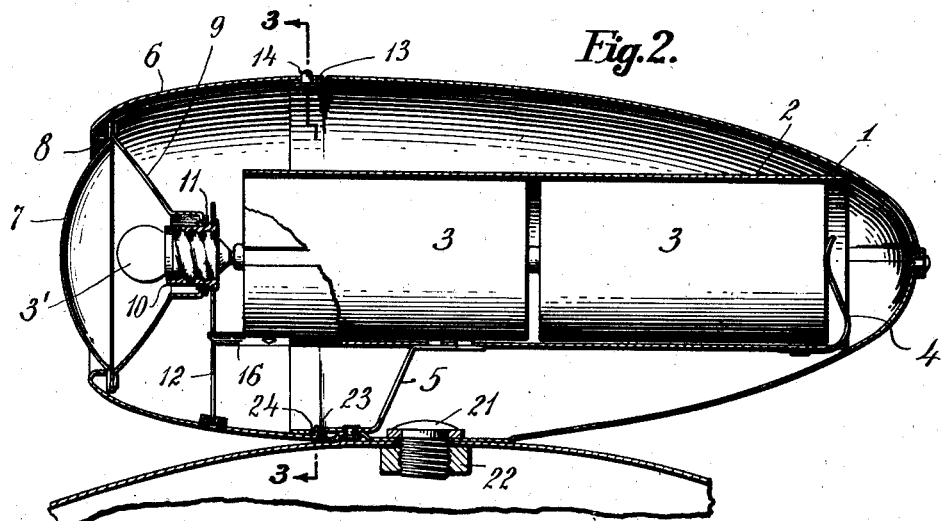
Fig. 2 is a longitudinal sectional view through the accessory when constructed as a lamp.

Referring to the drawings, particularly Fig. 2, 1 indicates the rear part of the casing which is preferably of the modern tear-drop or stream-line design. This portion of the casing is the same in the lamp, the horn and the combined horn and lamp, and arranged centrally within the part 1 along its longitudinal axis is a tubular support 2 for the dry cells 3. This tubular support is preferably formed of sheet metal split along one side so as to expand slightly when the cells are thrust into it to hold them snugly in place. The cells 3 are of the ordinary flashlight type, that is, they are covered with a paper insulating sleeve around the outside, but the end face is exposed so as to make contact with a spring contact member 4 riveted or otherwise attached to the inner or rear end of the supporting sleeve 2 and projecting through a slot in the side wall of the sleeve across the end thereof into position to engage the bottom of the inner cell when the cells are thrust into the support. The sleeve 2 is supported in the casing by a metal bracket 5 riveted at its lower end to the wall of the casing member 1 and welded or otherwise attached to the adjacent wall of the battery support or sleeve 2, as more clearly shown in Fig. 2.

Figure 4:
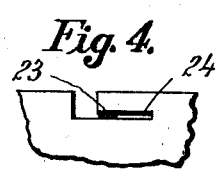
Fig. 4 is a detail of a portion of the casing.

At its open end the casing section 1 is constricted to form a neck for receiving the front casing section 6 which is of the same diameter at its open end as the unconstricted portion of the casing member 1, whereby, when the two parts of the casing are put together they present a smooth exterior. The two portions of the casing are held together at the top by a latch consisting of a resilient tongue 13 riveted to the inner surface of the neck of the casing section 1 and provided with a button 14 projecting through a hole in the neck, which button is adapted to engage a slot 15 in the front casing portion 6 when the two parts of the casing are put together. At the bottom the front edge of the part 6 is provided with an upstanding tongue 23 which is adapted to engage in a slot 24 at the base of the neck of the part 1 of the casing. As shown in Fig. 4 the slot 24 is L-shaped, the longitudinally extending portion being wide enough to receive the tongue 23 when the two parts of the casing are put together. The slot and tongue form in effect a bayonet joint by means of which the parts are locked together by a slight relative circumferential movement.

The front portion of the casing which, like the rear portion, is preferably formed of stamped or spun sheet metal, is provided with an opening at its end for receiving the crystal or lens 7. The center opening is in alignment with the axis of the tubular battery support and the edge of the opening is turned inwardly as shown at 8 to provide a seat against which the edge of the lens is held by the rim of the reflector 9 which is of the usual type employed in ordinary battery flashlights.

Supported at the center of the reflector is a lamp socket 10 which is insulated from the reflector by a collar 11 of insulating material, whereby the lamp bulb 3' will not be grounded through the reflector but only through the lamp socket itself, this arrangement being provided so that the lamp may be turned on and off by the simple expedient of turning the front half 6 of the casing relatively to the rear portion 1, as permitted by the slot 15 above described. To this end the support 2 for the battery is provided at its lower edge with a forwardly projecting contact strip 16 while the lamp socket 10 has attached to it at its base a sheet metal tongue 12 projecting radially outward from the lamp socket in position to engage the strip 16 when the pin 14 is at one end of the slot 15 and to be out of engagement with the strip 16 when the front part of the casing is turned to bring the button 14 to the other end of the slot.

When the bulb 3' is screwed in place in the lamp socket its center contact is in position to engage the center contact on the adjacent cell supported in the tubular member 2, the cells being held in contact with the lamp by the spring contact member 4. When the casing portion 6 is turned to bring the parts 12 and 16 in contact, the circuit will be completed through the battery and the lamp filament, thence through the contacts 12 and 16, sleeve 2 and contact 4.

The lamp may be provided with a bracket 20 for clamping it onto the handle bars or other part of the bicycle, or the lamp may be mounted directly on the mudguard by means of a bolt 21 projecting through the bottom wall of the casing portion 1 and provided with a nut 22 which engages the under side of the mudguard.

Figure 3:
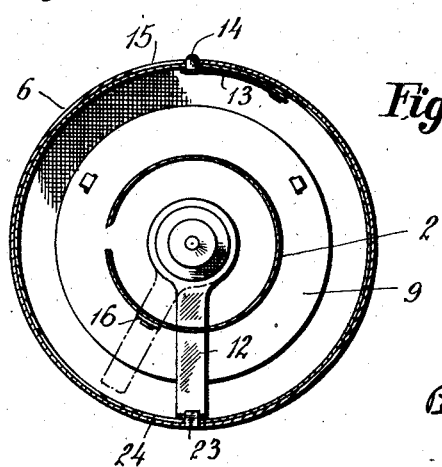
Fig. 3 is a section on line 3—3 of Fig. 2.

The operation of the lamp will be readily understood from the foregoing description. The slot 24 is so positioned with respect to the latch 13 that the tongue 23 will enter the wide portion of the slot when the button 14 is just beyond the end of the slot 15. Hence, if the front part of the casing is put on the neck of the rear part in position for the tongue 23 to enter the slot 24 and is then given a slight turn to the left, or counterclockwise, as shown in Fig. 3, the button 14 will snap into the slot 15 and at the same time the tongue 23 will pass into the narrow part of the slot 24, thus fastening the two parts together, while permitting sufficient relative movement to bring the contacts 12 and 16 into and out of engagement so that the lamp may be turned on or off without disengaging the two parts of the casing.

In Figs. 6, 7 and 8 I have shown my improved accessory equipped as a horn instead of a light. In this construction the two parts of the casing 1 and 6 are shaped as in the previously described construction and held together by the same arrangement of bayonet joint and latch. In this construction, however, the turning of the two parts one on the other is not utilized for switching the current from the battery on and off. Instead, a push button construction is employed to facilitate the more frequent operation which is required of a horn as compared with a light, which will of course be left turned on whenever the bicycle is in use after dark. The horn mechanism which is installed in the front part 6 of the casing comprises an electrical sounding element 25 which is preferably of the buzzer type, but of course may be of any other type requiring no greater electrical current than can be furnished by the ordinary flashlight cells. This sounding element is suspended inside the casing section 6 by a hanger 26 which is fixedly attached to the casing member 6 by an eyelet 27, which eyelet serves also as a guide for the switch button 28.

The hanger 26 serves to ground one side of the electrical circuit through the sound element against the casing, the circuit being completed through a wire 29 leading from the sounding element to a spring contact member 30 which is supported as shown on a strip of fibre or other insulating material 31 fastened in the hanger 26. The push button 28, which is of insulating material, is supported on the contact 30 and projects through the eyelet 27, and immediately underlying the contact 30 beneath the push button is a contact rivet 32 which serves to attach to the fibre strip 31 a contact bar 33 which extends transversely across the casing member 6 in position to be engaged by the center contact on the adjacent cell in the battery support 2. The free end of the strip 33 is held against movement by a washer 35 of insulating material which is fixedly attached to the inside of the casing member 6.

Instead of a lens in the opening in the end of the casing member 6, there is provided a sheet metal cap 37 which is preferably provided with openings 38 as shown in Fig. 6 for the ready emission of the sound from the sound element 25.

Figure 1:
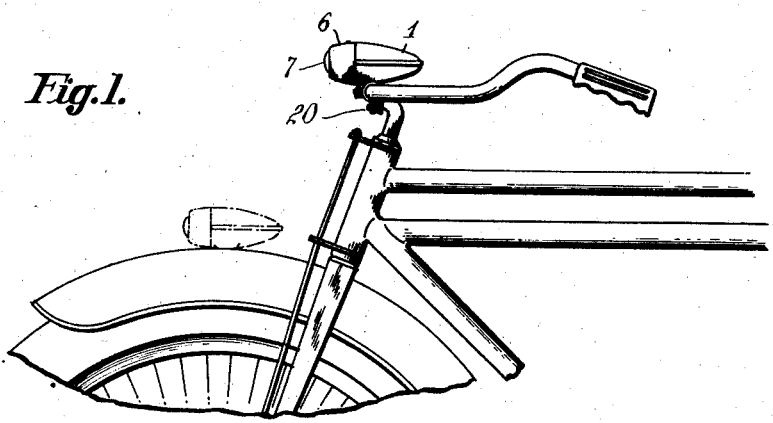
Fig. 1 shows a portion of a bicycle showing the different positions in which my improved accessory may be mounted thereon.

The horn is preferably attached to the handle bar of the bicycle where the switch 28 is readily acessible to the operator. The bicycle may thus be equipped with the lamp of Fig. 2 and the horn of Fig. 8, one on the mudguard and one on the handle bar, as shown in dotted and full lines, respectively, in Fig. 1.

Instead of constituting separate accessories the horn and lamp may be combined in a single structure as shown in Figs. 9, 10, 11 and 12. As here shown the rear part of the casing is the same as previously described, except that the contact member 16 on the battery support is not required. The front portion 6 is the same as employed for the lamp, as shown in Fig. 2. The front portion is not, however, connected directly to the rear portion, but instead a middle section 40 is provided which contains the sounding element 25. This middle portion 40 is shaped at its rear edge to fit over and be locked to the rear section 1 of the casing and at its front edge to provide an attachment for the front section 6. That is to say, the rear edge of the middle section is constructed like the rear edge of the front section 6 while its front edge is constructed like the front edge of the rear casing section 1.

The sounding element 25 is supported in the middle section 40 by means of a bracket 42 which is riveted to the casing section 40 and welded or otherwise secured to the sounding element 25. The bracket 42 forms a ground connection between the sounding element and the contact spring 4 at the rear end of the battery support. The bracket 42 is provided with a forwardly extending tongue 43' which projects into the path of the contact 12 projecting from the lamp socket and thus provides a switch for the lamp circuit, the lamp being turned on and off by turning the forward casing section 6 to the extent permitted by the latch, as described above.

The center contact of the light bulb engages a spring contact strip 43 which projects downwardly from a switch mechanism which is shown in detail in Figs. 10 and 11. As shown this switch mechanism comprises a bottom strip 45 of insulating fibre and an upper fibre strip 46 between which the strip 43 is clamped. The strip 43 projects beyond its support at the rear also, and is bent inwardly in position to rest against the center contact of the adjacent cell in the support, thus furnishing a continuous conductor from the battery to the center contact of the lamp bulb, whereby the lamp will remain lighted regardless of the position of the push button switch whenever the front portion of the casing is turned to bring the contact 12 against the tongue 43' of the bracket 42.

The horn likewise may be operated independently of the lamp. To this end the wire leading from the other side of the sound element circuit is connected to a spring contact member 47 which is attached to the upper face of the fibre strip 46. The forward end of the strip 47 underlies the push button 48 which is carried by a bracket 49 welded or otherwise secured to the inner wall of the casing section 40, with the end of the push button projecting through a hole in the wall of the casing section. The bracket 49 is provided with four downwardly extending tongues 50 which are bent around the assembled insulating strips and contact members, as shown in Fig. 10, to hold the parts in place.

The strip 47 is provided at the end underlying the push button with a tongue 51 which overlies a hole 52 in the fiber strip 46 so that when the button is pushed the tongue 51 will be projected through the hole into engagement with the contact strip 43 and thus complete the circuit through the sounding element. In order to permit the ready emission of the sound from the sounding element the casing section 40 is provided on each side with slots or louvers 53 as shown more particularly in Fig. 11.

While I have described my improved accessory as primarily intended for a bicycle, it may of course be used for other purposes. It is particularly useful as an emergency accessory for an automobile as the current is entirely independent of the current from the car battery. If, for example, the tail light burns out the accessory may be readily clamped somewhere on the rear of the vehicle to serve as a tail light. Also, if the horn fails it may be used as an emergency signal. It is likewise useful as a spotlight where temporary driving conditions make the use of such a light desirable.

I claim:

1. A unit of the type described including a casing comprising a relatively deep rear section and a relatively shallow front section, a tubular element, means for supporting the same within said rear section and to extend axially thereof, said element being adapted to receive dry cells of the type having a central forwardly extending terminal and an exposed base portion constituting a rearwardly extending and second terminal therefor, the central terminal of the outermost cell projecting beyond said tubular element, an electrical energy consuming means mounted within said front casing section, a contact strip extending transversely of said front section and in electrical connection with said electrical consuming means, a spring contact member carried by the rear portion of said tubular element and in electrical engagement with the base terminal portion of the innermost cell mounted thereby, one of said casing sections being formed with an opening, a projecting portion forming a part of the second of the same and to enter said opening to connect said casing sections adjacent one point in their periphery, one of said sections being moreover formed with an opening at a point substantially diametrically opposite from the location of the first named opening, and a spring pressed latch mounted by the second of said sections and adapted to enter said latter opening to provide a quick detachable coupling for said casing sections whereby said rear section will retain said cell and said front section will retain said energy consuming means and contact strip.

2. A unit of the type described including a casing comprising a relatively deep rear section and a relatively shallow front section, a tubular element, means for supporting the same within said rear section and to extend axially thereof, said element being adapted to receive dry cells of the type having a central forwardly extending terminal and an exposed base portion constituting a rearwardly extending and second terminal therefor, the central terminal of the outermost cell projecting beyond said tubular element, an electrical energy consuming means mounted within said front casing section, means for connecting said casing sections and permitting of relative axial rotation thereof, and switch means forming a part of said unit and coupled to said electrical consuming means and said terminal, said switch means including relatively movable elements respectively coupled to said rear and front sections and said switch being rendered operative upon said casing sections being axially turned with respect to each other and in a given direction and being rendered inoperative upon relative turning being effected in the opposite direction to respectively cause engagement and disengagement between said elements.

3. A unit of the type described including a casing comprising a relatively deep rear section and a relatively shallow front section, a tubular element, means for supporting the same within said rear section and to extend axially thereof, said element being adapted to receive dry cells of the type having a central forwardly extending terminal and an exposed base portion constituting a rearwardly extending and second terminal therefor, the central terminal of the outermost cell projecting beyond said tubular element, an electrical energy consuming means mounted within said front casing section and coupled to such latter terminal, a contact strip mounted by said front section and in electrical connection with said consuming means, a further contact strip mounted by said tubular element and projecting from its forward edge into the plane of said first named strip, means for electrically coupling the base of the innermost cell with said tubular element, said last named contact strip having a cam edge for engagement with said first named strip, and means for coupling the casing sections to each other and to permit of relative axial rotation thereof whereby to engage and disengage said strips and to close and interrupt the circuit through said consuming means.

4. A lamp comprising a relatively deep battery containing rear casing section and a relatively shallow front casing section containing electrical energy consuming means, a contact strip extending transversely of said front section and in electrical connection with said electrical consuming means, conducting means within the deep section for holding a battery with its central terminal in contact with a terminal of said energy consuming means and provided with a switch contact projecting into said front section when said front and rear sections are connected, a spring contact for electrical engagement with the base portion of said battery, and means for connecting said casing sections and permitting of relative axial rotation thereof, whereby upon rotation in one direction, said transverse strip is brought into contact with said switch contact strip and whereby upon rotation in the opposite direction, said contact strips are disengaged.

5. A lamp comprising a relatively deep battery containing rear casing section and a relatively shallow front casing section containing electrical energy consuming means, a forward contact strip contained within said front section and in electrical connection with said electrical consuming means, conducting means within the deep section for holding a battery with its central terminal in contact with a terminal of said energy consuming means and provided with a switch contact strip projecting into said front section when said front and rear sections are connected, a spring contact for electrical engagement with the base portion of said battery, said switch contact strip having its free projecting edge angularly cut so as to provide a cam action when it is brought into contact with said forward contact strip and means for connecting said casing sections and permitting of relative axial rotation thereof, whereby upon rotation in one direction, said forward strip is brought into contact with said switch contact strip and whereby upon rotation in the opposite direction, said contact strips are disengaged.

6. A lamp comprising a relatively deep battery containing rear casing section and a relatively shallow front casing section containing electrical energy consuming means, a contact strip extending transversely of said front section and in electrical connection with said electrical consuming means, conducting means within the deep section for holding a battery with its central terminal in contact with a terminal of said energy consuming means and provided with a switch contact strip projecting into said front section when said front and rear sections are connected, a spring contact for electrical engagement with the base portion of said battery, and means for connecting said casing sections and permitting of relative axial rotation thereof, said means comprising an elongated opening on one of said casing sections, a projecting portion forming a part of the other of said casing sections, said projecting portion adapted to slide in said opening and one of said sections additionally formed with a further elongated opening at a point substantially diametrically opposite from the location of the first named opening and a spring pressed latch mounted by the other of said sections and adapted to enter and slide in said latter opening to provide a quick detachable coupling for said casing sections, whereby said rear section will retain said battery and said front section will retain said energy consuming means and whereby upon axial rotation in one direction, said transverse strip is brought into contact with said switch contact strip and whereby upon rotation in the opposite direction, said contact strips are disengaged.

7. A lamp comprising a relatively deep battery containing rear casing section and a relatively shallow front casing section containing electrical energy consuming means, a contact strip extending transversely of said front section and in electrical connection with said electrical consuming means, conducting means within the deep section for holding a battery with its central terminal in contact with a terminal of said energy consuming means and provided with a switch contact strip projecting into said front section when said front and rear sections are connected, a spring contact for electrical engagement with the base portion of said battery, said switch contact strip having its free projecting edge angularly cut so as to provide a cam action when it is brought into contact with said transverse contact strip and means for connecting said casing sections and permitting of relative axial rotation thereof, said means comprising an elongated opening on one of said casing sections, a projecting portion forming a part of the other of said casing sections, said projecting portion adapted to slide in said opening and one of said sections additionally formed with a further elongated opening at a point substantially diametrically opposite from the location of the first named opening and a spring pressed latch mounted by the other of said sections and adapted to enter and slide in said latter opening to provide a quick detachable coupling for said casing sections, whereby said rear section will retain said cell or cells and said front section will retain said energy consuming means and whereby upon axial rotation in one direction said transverse strip is brought into contact with said switch contact strip and whereby upon rotation in the opposite direction, said contact strips are disengaged.

CARL E. MEYERHOEFER.